United States Patent
Baek et al.

(10) Patent No.: US 9,148,864 B2
(45) Date of Patent: *Sep. 29, 2015

(54) SYSTEM AND METHOD FOR SWITCHING MOBILE STATION IDENTIFICATION IN WIRELESS COMMUNICATION SYSTEM

(71) Applicant: Samsung Electronics Co., Ltd., Suwon-si, Gyeonggi-do (KR)

(72) Inventors: Young-Kyo Baek, Seoul (KR); Young-Bin Chang, Anyang-si (KR); Yeong-Moon Son, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/299,572

(22) Filed: Jun. 9, 2014

(65) Prior Publication Data

US 2014/0269517 A1 Sep. 18, 2014

Related U.S. Application Data

(63) Continuation of application No. 13/168,094, filed on Jun. 24, 2011, now Pat. No. 8,750,209.

(30) Foreign Application Priority Data

Jul. 5, 2010 (KR) .......................... 10-2010-0064277

(51) Int. Cl.
*H04W 4/00* (2009.01)
*H04W 60/00* (2009.01)
(Continued)

(52) U.S. Cl.
CPC ................ *H04W 60/00* (2013.01); *H04W 8/26* (2013.01); *H04W 8/06* (2013.01)

(58) Field of Classification Search
CPC ........................................................ H04W 8/26
USPC ........................................................... 370/328
See application file for complete search history.

(56) References Cited

U.S. PATENT DOCUMENTS 8,320,300 B2 * 11/2012 Nylander et al. ............. 370/328
8,750,209 B2 * 6/2014 Baek et al. .................... 370/328
(Continued)

FOREIGN PATENT DOCUMENTS

CN 101588576 A 11/2009
KR 10-2007-0068456 A 6/2007
(Continued)

OTHER PUBLICATIONS

Roshni Srinivasan, "IEEE 802.16m System Description Document (SDD)", Sep. 24, 2009, IEEE 802.16m-09/0034r2.
(Continued)

*Primary Examiner* — Wei Zhao
(74) *Attorney, Agent, or Firm* — Jefferson IP Law, LLP

(57) ABSTRACT

A system and a method for switching mobile station identification information in a wireless communication system are provided. The method includes sending, at a base station, a RNG-ReSPonse (RSP) message including a temporary mobile station identifier to the mobile station, determining, at the mobile station, the temporary mobile station identifier in the RNG-RSP signal, when base station receives REGistration (REG)-REQ message including the temporary mobile station identifier from the mobile station, sending, at the base station, a REG-RSP message to the mobile station, determining, at the mobile station, the mobile station identifier in the REG-RSP message and sending a response signal for the REG-RSP message to the base station, when receiving the response signal for the REG-RSP message, deleting, at the base station, the temporary mobile station identifier of the mobile station, and communicating, at the mobile station and the base station, using the mobile station identifier.

24 Claims, 16 Drawing Sheets

(51) Int. Cl.
*H04W 8/26* (2009.01)
*H04W 8/06* (2009.01)

(56) References Cited

U.S. PATENT DOCUMENTS

| | | |
|---|---|---|
| 2007/0291750 A1 | 12/2007 | Nylander et al. |
| 2010/0015951 A1 | 1/2010 | Hahn et al. |
| 2011/0070915 A1* | 3/2011 | Fong et al. ............ 455/517 |
| 2011/0188453 A1 | 8/2011 | Choi et al. |
| 2011/0200021 A1 | 8/2011 | Johansson |
| 2012/0190363 A1 | 7/2012 | Maeda et al. |

FOREIGN PATENT DOCUMENTS

| | | |
|---|---|---|
| KR | 10-2009-0093736 A | 9/2009 |
| KR | 10-2010-0008326 A | 1/2010 |
| WO | 2010008199 A2 | 1/2010 |

OTHER PUBLICATIONS

U.S. Appl. No. 61/078,570, "Medium Access Control for Wireless Systems," Jul. 7, 2008.
Baek, Youngkyo et al., Proposed Changes/Refinements to the Section 10.8 Network Entry of IEEE 802.16m SDD, IEEE 802.16 Broadband Wireless Access Working Group, Aug. 20, 2009.

* cited by examiner

SYSTEM AND METHOD FOR SWITCHING MOBILE STATION IDENTIFICATION IN WIRELESS COMMUNICATION SYSTEM

PRIORITY

This application is a continuation application of a U.S. patent application Ser. No. 13/168,094, filed on Jun. 24, 2011, which claims the benefit under 35 U.S.C. §119(a) of a Korean patent application filed in the Korean Intellectual Property Office on Jul. 5, 2010, and assigned Serial No. 10-2010-0064277, the entire disclosure of each of which is hereby incorporated by reference.

BACKGROUND OF THE INVENTION

1. Field of the Invention

The present invention relates to an initial network entry of a mobile station. More particularly, the present invention relates to a system and a method for switching a Temporary STation IDentifier (TSTID) to an STID in a case of network entry in a wireless communication system.

2. Description of the Related Art

A wireless communication system allocates a STation IDentifier (STID) to identify a Mobile Station (MS) in communication between a Base Station (BS) and the MS. For example, according to the Institute of Electrical and Electronics Engineers (IEEE) 802.16m standard, the base station allocates a Temporary STID (TSTID) to the mobile station in the ranging procedure in order to prevent outside exposure of relationship between the STID and the MS Media Access Control (MAC) address. Thereafter, the base station assigns a new STID encrypted to the mobile station in the registration procedure, which follows MS authorization and authentication procedure. That is, the base station and the mobile station communicate with each other using TSTID before the registration procedure, and using the STID after the registration procedure.

As stated above, after the registration procedure, the base station and the mobile station switch the TSTID of the mobile station to the STID. However, when an error occurs in the process of switching from the TSTID to the STID, the identification information of the mobile station is incorrectly recognized by the base station and thus the communication can be interrupted.

Therefore, a need exists for a system and a method for matching identification information of a mobile station over TSTID-STID switch time, which is recognized by the mobile station and a base station, in a wireless communication system.

SUMMARY OF THE INVENTION

Aspects of the present invention are to address at least the above-mentioned problems and/or disadvantages and to provide at least the advantages described below. Accordingly, an aspect of the present invention is to provide a system and a method for matching identification information of a mobile station over TSTID-STID switch time, which is recognized by the mobile station and a base station, in a wireless communication system.

Another aspect of the present invention is to provide a system and a method for switching identification information of a mobile station from a Temporary STation IDentifier (TSTID) to an STID at the mobile station and a base station of a wireless communication system.

Another aspect of the present invention is to provide a system and a method for switching a TSTID of a mobile station to an STID at the mobile station and a base station of a wireless communication system.

Another aspect of the present invention is to provide a system and a method for maintaining an identifier of a mobile station as a TSTID until an identification switch of the mobile station is determined at a base station of a wireless communication system.

Another aspect of the present invention is to provide a system and a method for transmitting a switched identifier of the mobile station to the mobile station of a wireless communication system.

According to an aspect of the present invention, a method for transmitting identification information to a mobile station in a wireless communication system is provided. The method includes, when a base station receives a RaNGing (RNG)-REQuest (REQ) message from the mobile station, a base station sending a RNG-ReSPonse (RSP) message including a temporary mobile station identifier to the mobile station, the mobile station determining the temporary mobile station identifier in the RNG-RSP signal, when base station receives REGistration (REG)-REQ message including the temporary mobile station identifier from the mobile station, the base station sending a REG-RSP signal including a station identifier of the mobile station to the mobile station, the mobile station determining the mobile station identifier in the REG-RSP message and sending a response signal for the REG-RSP message to the base station, when receiving the response signal for the REG-RSP message, deleting, at the base station, the temporary mobile station identifier of the mobile station, and communicating, at the mobile station and the base station, using the mobile station identifier (STID).

According to another aspect of the present invention, a wireless communication system for transmitting identification information to a mobile station is provided. The wireless communication system includes the mobile station for sending RaNGing (RNG)-REQuest (REQ) message to a base station, and the base station for, when RNG-REQ message is received, sending a RNG-RSP signal including a temporary mobile station identifier to the mobile station. When base station receives a REGistration (REG)-REQ message including the temporary mobile station identifier from the mobile station, the base station sends a REG-RSP message including a mobile station identifier to the mobile station. The mobile station determines the mobile station identifier in the REG-RSP message and sends a response signal for the REG-RSP message to the base station. When receiving the response signal for the REG-RSP message, the base station deletes the temporary mobile station identifier of the mobile station. The mobile station and the base station communicate using the mobile station identifier.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
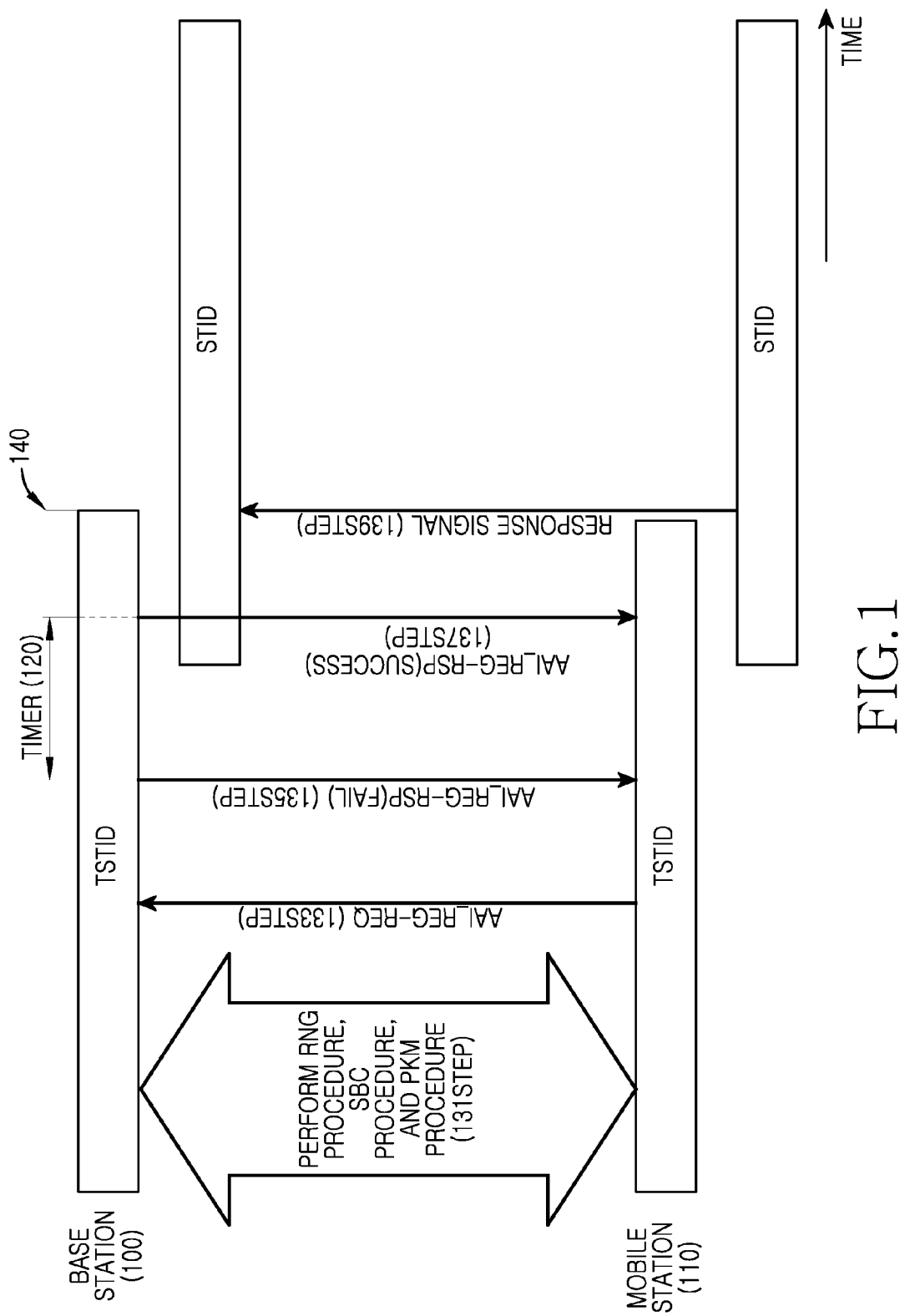
FIG. 1 illustrates a method for sending a response signal for a REGistration (REG)-ReSPonse (RSP) message in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for switching identification information of a mobile station in a wireless communication system.

Hereinafter, it is assumed that the wireless communication system conforms to the Institute of Electrical and Electronics Engineers (IEEE) 802.16m standard. Accordingly, a Temporary mobile STation IDentifier (TSTID) and a mobile STation IDentifier (STID) are used. The identification information of the mobile station can be switched in the same manner in wireless communication systems adopting other communication standards.

FIGS. 1 through 16, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 illustrates a method for sending a response signal for a REGistration (REG)-ReSPonse (RSP) message in a wireless communication system according to an exemplary embodiment of the present invention.

Referring to FIG. 1, when a mobile station 110 performs an initial network entry to a base station 100, the base station 100 and the mobile station 110 conduct a RaNGing (RNG) procedure, a Subscriber station Basic Capability (SBC) procedure, and a Privacy and Key Management (PKM) procedure for the initial network entry in step 131. In so doing, the base station 100 allocates the TSTID to the mobile station 110 using a RNG-RSP message which is sent in reply to RNG-REQuest (REQ) of the mobile station 110. Hence, the base station 100 and the mobile station 110 carry out the SBC procedure and the PKM procedure using the TSTID.

After the PKM procedure with the base station 100, the mobile station 110 sends a REG-REQ message to the base station 100 in step 133. The mobile station 110 sends the REG-REQ message using the TSTID.

In reply to the REG-REQ message, the base station 100 sends to the mobile station 110, a REG-RSP message including the STID allocated to the mobile station 110 in step 135.

In so doing, the base station 100 does not delete the TSTID of the mobile station 110. That is, the base station 100 maintains the TSTID together with the STID.

While sending the REG-RSP message, the base station 100 drives a timer 120 to determine a retransmission point of the REG-RSP message.

When receiving no response signal for the REG-RSP message until a driving time of the timer 120 expires, the base station 100 recognizes that the transmission of the REG-RSP message fails. Thus, the base station 100 retransmits the REG-RSP message to the mobile station 110 in step 137. The base station 100 re-drives the timer 120.

Upon receiving the REG-RSP message, the mobile station 110 determines the STID in the REG-RSP message.

In step 139, the mobile station 110 sends to the base station 100 a response signal for the REG-RSP message. The mobile station 110 sends the response signal using the STID or the TSTID. The mobile station 110 can delete the TSTID.

When receiving a response signal for the REG-RSP message from the mobile station 110 before the driving time of the timer 120 expires, the base station 100 recognizes that the mobile station 110 switches its identification information from the TSTID to the STID. Upon determining the switching of the identification information of the mobile station 110, the base station 100 communicates with the mobile station 110 using the STID. Hence, the base station 100 deletes the unnecessary TSTID of the mobile station 110 in step 140.

As explained above, the base station 100 receives the response signal for the REG-RSP message from the mobile station 110 and maintains both of the TSTID and the STID of the mobile station 110 until the switching of the identification information of the mobile station 110 is determined. Upon receiving the response signal, the mobile station 110 can use any one of a Message (MSG) Acknowledgement (ACK) message, a bandwidth request header, and a REG-ACK message.

In this exemplary embodiment of the present invention, when receiving the response signal from the mobile station, the base station deletes the TSTID of the mobile station.

According to another exemplary embodiment of the present invention, when receiving the bandwidth request header from the mobile station, the base station may delete the TSTID of the mobile station. More particularly, to allocate resources for sending the response signal, the mobile station can send the bandwidth request header including the STID to the base station. Based on the bandwidth request header, the base station may recognize that the identification information of the mobile station is switched to the STID. Hence, upon receiving the bandwidth request header from the mobile station, the base station can delete the TSTID of the mobile station.

Figure 2:
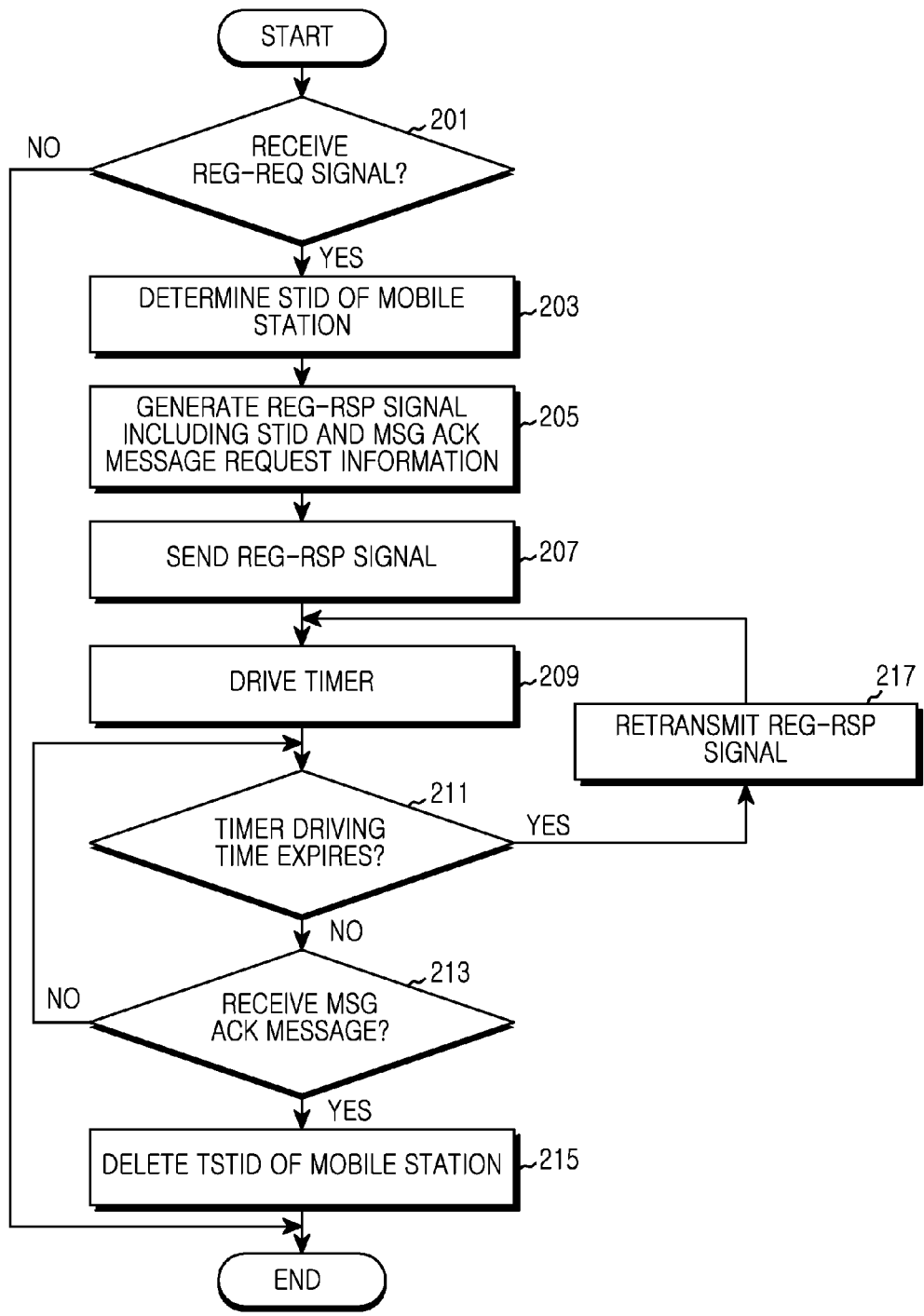
FIG. 2 illustrates a method of a base station for sending a REG-RSP message according to an exemplary embodiment of the present invention.

When the mobile station 110 uses the MSG-ACK message as the response signal for the REG-RSP message, the base station 100 operates as shown in FIG. 2.

FIG. 2 illustrates a method of a base station for sending a REG-RSP message according to an exemplary embodiment of the present invention.

Referring to FIG. 2, the base station performs an initial network entry procedure with a mobile station. For example, for the initial network entry with the mobile station, the base station carries out the RNG procedure, the SBC procedure, and the PKM procedure. The base station allocates the TSTID to the mobile station using the RNG-RSP message.

Thereafter, the base station determines whether the REG-REQ message is received from the mobile station in step 201. The REG-REQ message includes the TSTID allocated to the mobile station.

If it is determined in step 201 that the REG-REQ message is received, the base station determines the STID to allocate to the mobile station in step 203.

In step 205, the base station generates the REG-RSP message including the STID and MSG-ACK message request information. For example, when the REG-RSP message includes the MSG-ACK message request information, the base station sets a polling bit of a Media Access Control (MAC) Control Extended Header (MCEH) of a MAC Protocol Data Unit (PDU) (MPDU) carrying the REG-RSP message, to 1.

In step 207, the base station sends the REG-RSP message to the mobile station.

In step 209, the base station drives the timer to determine the retransmission point of the REG-RSP message.

In step 211, the base station determines whether the driving time of the timer expires.

If it is determined in step 211 that the driving time of the timer expires, the base station recognizes the failure of the REG-RSP message transmission. Thus, the base station retransmits the REG-RSP message to the mobile station in step 217.

Thereafter, the base station returns to step 209 and drives the timer to determine the retransmission point of the REG-RSP message.

In contrast, if it is determined in step 211 that the driving time of the timer does not expire, the base station determines whether the MSG ACK message is received from the mobile station in step 213.

If it is determined in step 213 that no MSG ACK message is received, the base station re-determines whether the driving time of the timer expires in step 211.

Upon receiving the MSG ACK message, the base station recognizes that the mobile station switches the identification information from the TSTID to the STID. Upon determining the switching of the identification information of the mobile station, the base station communicates with the mobile station using the STID. In step 215, the base station deletes the TSTID of the mobile station.

Thereafter, the base station completes this process.

In this exemplary embodiment of the present invention, upon receiving the MSG ACK message from the mobile station, the base station deletes the TSTID of the mobile station.

In contrast, if it is determined that the bandwidth request header is received from the mobile station, the base station may delete the TSTID of the mobile station. More particularly, to allocate resources for sending the MSG ACK message, the mobile station can send the bandwidth request header including the STID to the base station. Based on the bandwidth request header, the base station may recognize that the identification information of the mobile station is switched to the STID. Hence, upon receiving the bandwidth request header from the mobile station, the base station can delete the TSTID of the mobile station.

Figure 3:
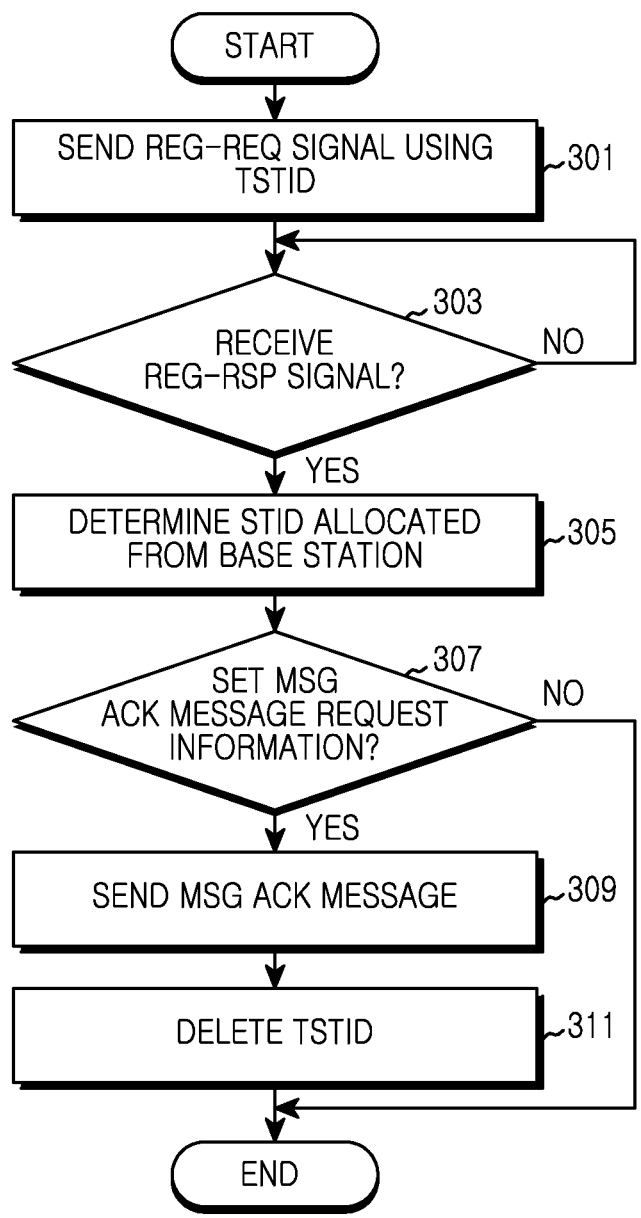
FIG. 3 illustrates a method of a mobile station for sending an MSG-ACK message as an acknowledgement according to an exemplary embodiment of the present invention.

When the MSG ACK message is used as the response signal for the REG-RSP message, the mobile station 110 operates as shown in FIG. 3.

FIG. 3 illustrates a method of a mobile station for sending a MSG ACK message as an acknowledgement according to an exemplary embodiment of the present invention.

Referring to FIG. 3, the mobile station performs an initial network entry procedure with a base station. For example, for the initial network entry with the base station, the mobile station carries out the RNG procedure, the SBC procedure, and the PKM procedure. The mobile station is allocated the TSTID from the base station using the RNG-RSP message.

Thereafter, the mobile station sends the REG-REQ message to the base station in step 301. The REG-REQ message includes the TSTID.

In step 303, the mobile station determines whether the REG-RSP message is received from the base station.

Although it may not be depicted in FIG. 3, when receiving no REG-RSP message within a reference time, the mobile station recognizes that the transmission of the REG-REQ message fails. Thus, the mobile station retransmits the REG-REQ message to the base station.

If it is determined in step 303 that the REG-RSP message is received, the mobile station determines the STID allocated by the base station, in the REG-RSP message in step 305.

In addition, the mobile station receiving the REG-RSP message determines whether the REG-RSP message includes the MSG ACK message request information in step 307. For example, the mobile station determines whether the polling bit of the MCEH of the MPDU carrying the REG-RSP message is set to 1.

If it is determined in step 307 that the REG-RSP message does not include the MSG ACK message request information, the mobile station completes this process.

In contrast, if it is determined in step 307 that the REG-RSP message includes the MSG ACK message request information, the mobile station sends the MSG ACK message to the base station in step 309. At this time, the mobile station sends the MSG ACK message request signal including the TSTID or the STID.

In step 311, the mobile station deletes the TSTID. When the STID is allocated from the base station, the mobile station communicates with the base station using the STID instead of the TSTID. Accordingly, the mobile station deletes the unnecessary TSTID.

Thereafter, the mobile station completes this process.

In this exemplary embodiment of the present invention, if it is determined in step 307 that the REG-RSP message does not include the MSG ACK message request information, the mobile station completes this process.

In contrast, if it is determined in step 307 that the REG-RSP message does not include the MSG ACK message request information, the mobile station may delete the TSTID in step 311.

Figure 4:
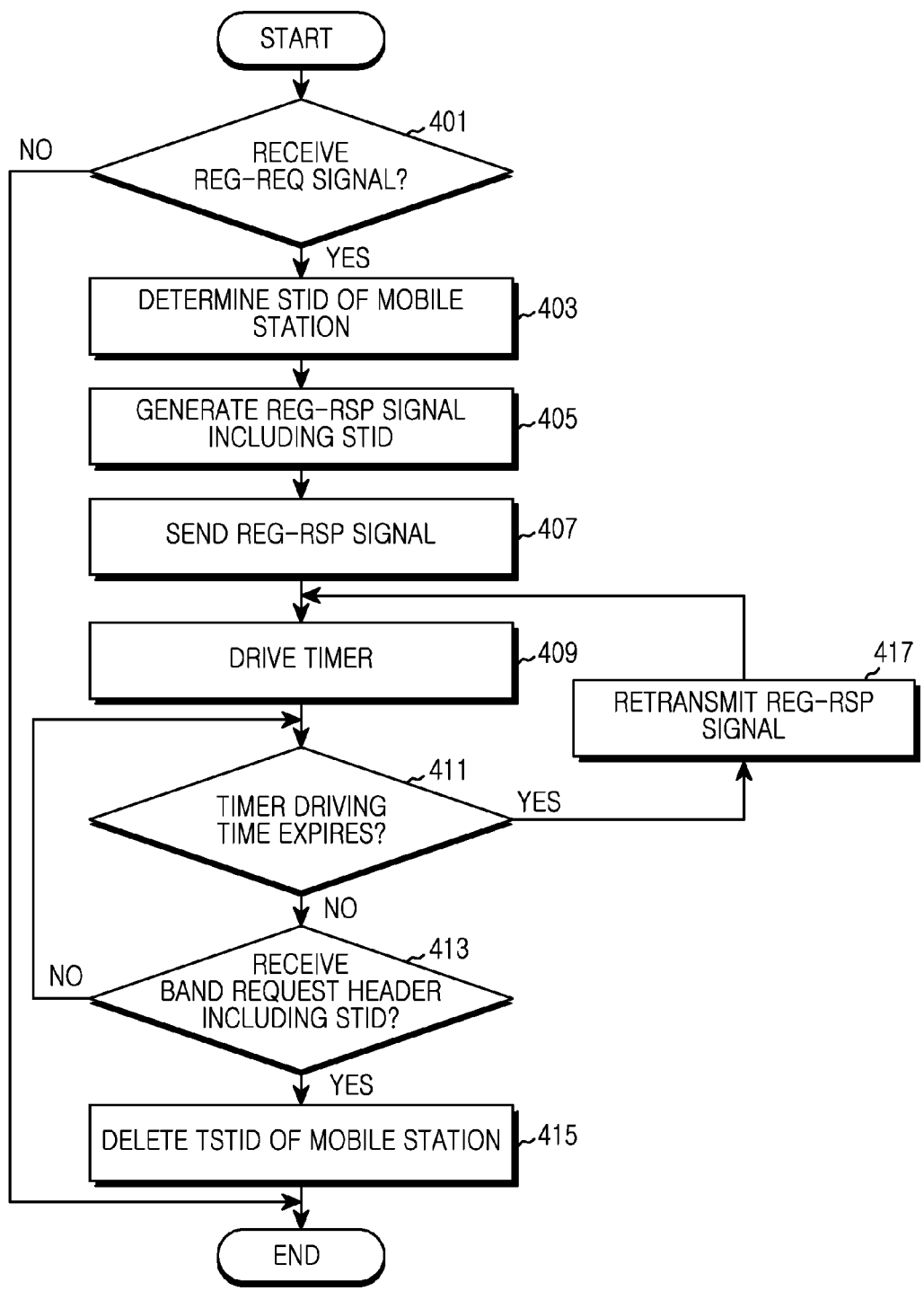
FIG. 4 illustrates a method of a base station for sending a REG-RSP message according to an exemplary embodiment of the present invention.

When the mobile station 110 uses the bandwidth request header as the response signal for the REG-RSP message, the base station 100 operates as shown in FIG. 4.

FIG. 4 illustrates a method of a base station for sending a REG-RSP message according to an exemplary embodiment of the present invention.

Referring to FIG. 4, the base station performs an initial network entry procedure with a mobile station. For example, for the initial network entry with the mobile station, the base station carries out the RNG procedure, the SBC procedure, and the PKM procedure. The base station allocates the TSTID to the mobile station using the RNG-RSP signal.

Thereafter, the base station determines whether the REG-REQ message is received from the mobile station in step 401. The REG-REQ message includes the TSTID allocated to the mobile station.

If it is determined in step 401 that the REG-REQ message is received, the base station determines the STID to be allocated to the mobile station in step 403.

In step 405, the base station generates the REG-RSP message including the STID.

In step 407, the base station sends the REG-RSP message to the mobile station.

In step 409, the base station drives the timer to determine the retransmission point of the REG-RSP message.

In step 411, the base station determines whether the driving time of the timer expires.

If it is determined in step 411 that the driving time of the timer expires, the base station recognizes the failure of the REG-RSP message transmission. Thus, the base station retransmits the REG-RSP message to the mobile station in step 417.

Thereafter, the base station returns to step 409 and drives the timer to determine the retransmission point of the REG-RSP message.

In contrast, if it is determined in step 411 that the driving time of the timer does not expire, the base station determines whether the bandwidth request header is received from the mobile station in step 413.

If it is determined in step 413 that the bandwidth request header is not received, the base station re-determines whether the driving time of the timer expires in step 411.

In contrast, if it is determined in step 413 that the bandwidth request header is received, the base station recognizes that the mobile station switches the identification information from the TSTID to the STID. Upon determining the switching of the identification information of the mobile station, the base station communicates with the mobile station using the STID. In step 415, the base station deletes the TSTID of the mobile station.

Thereafter, the base station completes this process.

Figure 5:
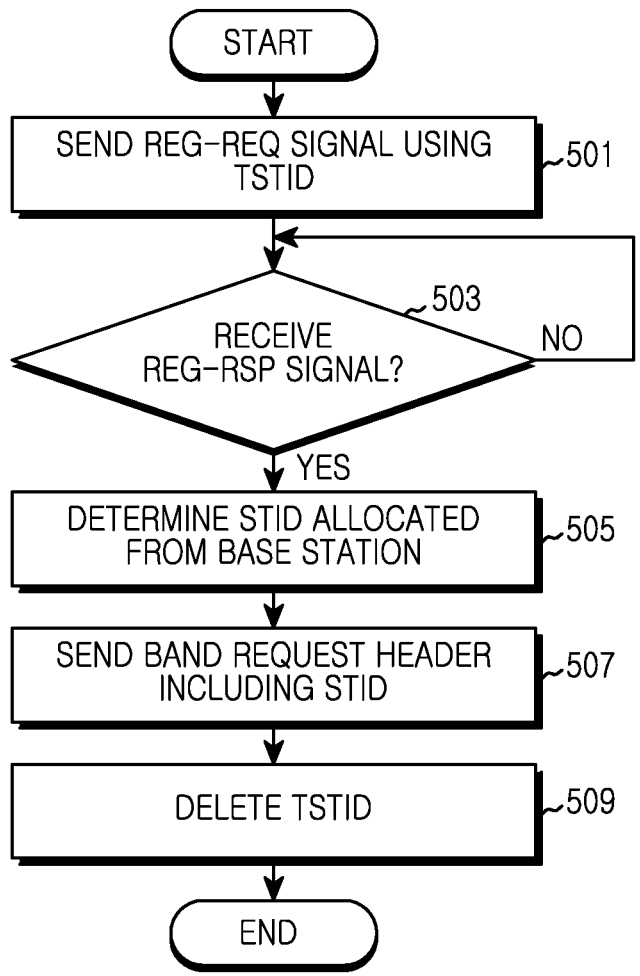
FIG. 5 illustrates a method of a mobile station for sending a bandwidth request header according to an exemplary embodiment of the present invention.

When the bandwidth request header is used as the response signal for the REG-RSP message, the mobile station 110 operates as shown in FIG. 5.

FIG. 5 illustrates a method of a mobile station for sending a bandwidth request header according to an exemplary embodiment of the present invention.

Referring to FIG. 5, the mobile station performs an initial network entry procedure with a base station. For example, for the initial network entry with the base station, the mobile station carries out the RNG procedure, the SBC procedure, and the PKM procedure. The mobile station is allocated the TSTID from the base station using the RNG-RSP signal.

Thereafter, the mobile station sends the REG-REQ message to the base station in step 501. The REG-REQ message includes the TSTID.

In step 503, the mobile station determines whether the REG-RSP message is received from the base station.

Although it may not be depicted in FIG. 5, if it is determined that no REG-RSP message is received within the reference time, the mobile station recognizes that the transmission of the REG-REQ message fails. Thus, the mobile station retransmits the REG-REQ message to the base station.

If it is determined in step 503 that the REG-RSP message is received, the mobile station determines the STID allocated by the base station, in the REG-RSP message in step 505.

Thereafter, the mobile station sends the bandwidth request header including the STID to the base station in step 507. For instance, when the mobile station has data to transmit, it sends the bandwidth request header to the base station so as to allocate the necessary resources. When the mobile station has no data to transmit, it sends to the base station the bandwidth request header including the requested bandwidth which is set to zero.

In step 509, the mobile station deletes the TSTID. When the STID is allocated from the base station, the mobile station communicates with the base station using the STID instead of the TSTID. Accordingly, the mobile station deletes the unnecessary TSTID.

Thereafter, the mobile station completes this process.

In this exemplary embodiment of the present invention, when there is no data to transmit, the mobile station sets the requested bandwidth of the bandwidth request header to zero.

In contrast, when there is data to transmit, the mobile station can set the requested bandwidth of the bandwidth request header to a certain small value (e.g., 1 byte). In this case, the mobile station is allocated the requested resource from the base station and deletes the TSTID.

Figure 6:
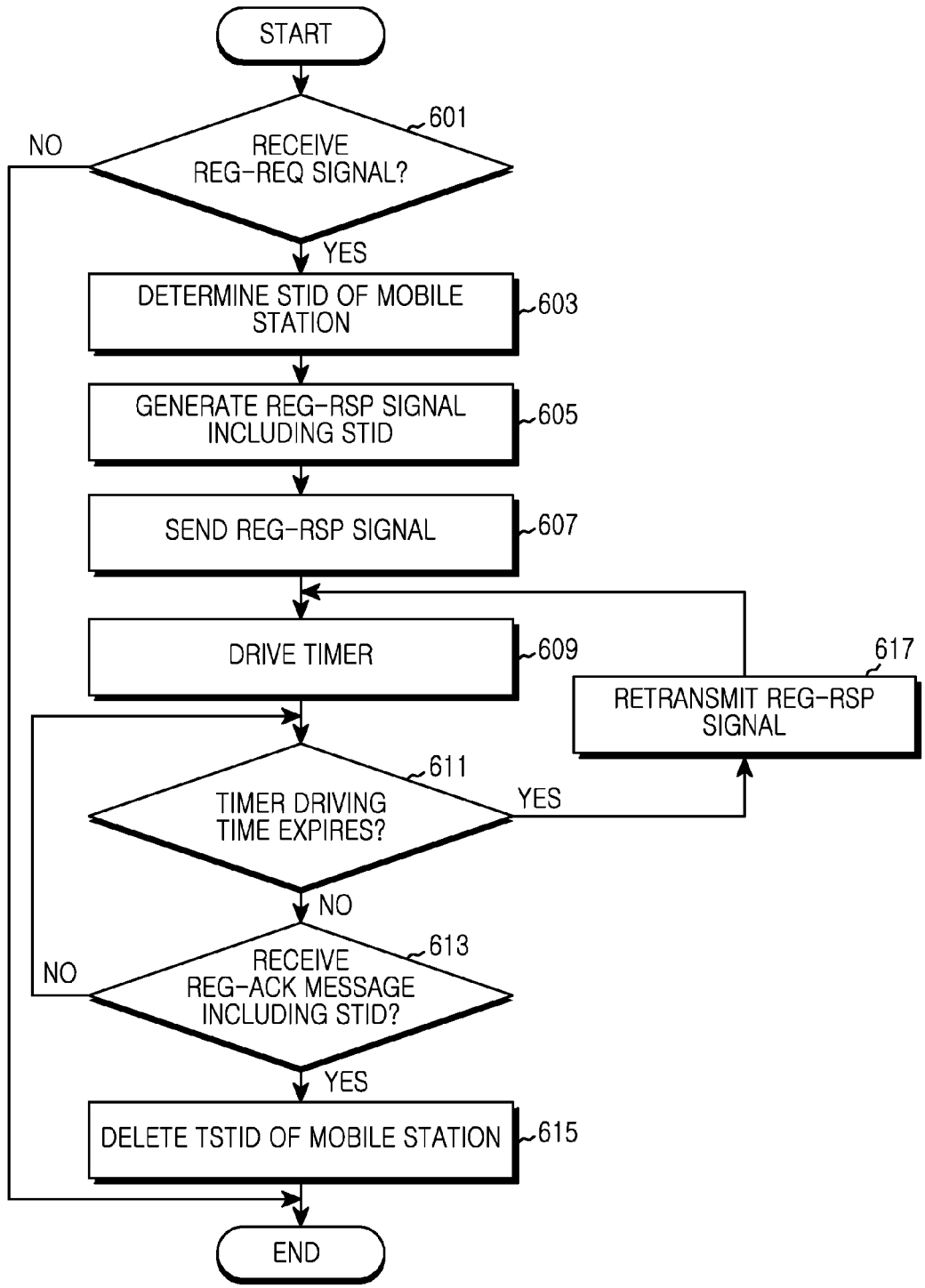
FIG. 6 illustrates a method of a base station for sending a REG-RSP message according to an exemplary embodiment of the present invention.

When the mobile station 110 uses the response message as the response signal for the REG-RSP message, the base station 100 operates as shown in FIG. 6.

FIG. 6 illustrates a method of a base station for sending a REG-RSP message according to an exemplary embodiment of the present invention.

Referring to FIG. 6, the base station performs an initial network entry procedure with a mobile station. For example, for the initial network entry with the mobile station, the base station carries out the RNG procedure, the SBC procedure, and the PKM procedure. The base station allocates the TSTID to the mobile station using the RNG-RSP signal.

Thereafter, the base station determines whether the REG-REQ message is received from the mobile station in step 601. The REG-REQ message includes the TSTID allocated to the mobile station.

If it is determined in step 601 that the REG-REQ message is received, the base station determines the STID to be allocated to the mobile station in step 603.

In step 605, the base station generates the REG-RSP message including the STID.

In step 607, the base station sends the REG-RSP message to the mobile station.

In step 609, the base station drives the timer to determine the retransmission point of the REG-RSP message.

In step 611, the base station determines whether the driving time of the timer expires.

If it is determined in step 611 that the driving time of the timer expires, the base station recognizes the failure of the REG-RSP message transmission. Thus, the base station retransmits the REG-RSP message to the mobile station in step 617.

Thereafter, the base station returns to step 609 and drives the timer to determine the retransmission point of the REG-RSP message.

In contrast, if it is determined in step 611 that the driving time of the timer does not expire, the base station determines whether the REG-ACK message for the REG-RSP message is received from the mobile station in step 613.

If it is determined in step 613 that the REG-ACK message for the REG-RSP message is not received, the base station re-determines whether the driving time of the timer expires in step 611.

In contrast, if it is determined in step 613 that the REG-ACK message for the REG-RSP message is received, the base station recognizes that the mobile station switches the identification information from the TSTID to the STID. Upon determining the switching of the identification information of the mobile station, the base station communicates with the mobile station using the STID. In step 615, the base station deletes the TSTID of the mobile station.

Thereafter, the base station completes this process.

In this exemplary embodiment of the present invention, if it is determined that the REG-ACK message is received from the mobile station, the base station deletes the TSTID of the mobile station.

In contrast, if it is determined that the bandwidth request header is received from the mobile station, the base station may delete the TSTID of the mobile station. More particularly, to allocate the resources for sending the REG-ACK message, the mobile station can send the bandwidth request header including the STID to the base station. Based on the bandwidth request header, the base station may recognize that the identification information of the mobile station is switched to the STID. Hence, upon receiving the bandwidth request header from the mobile station, the base station can delete the TSTID of the mobile station.

Figure 7:
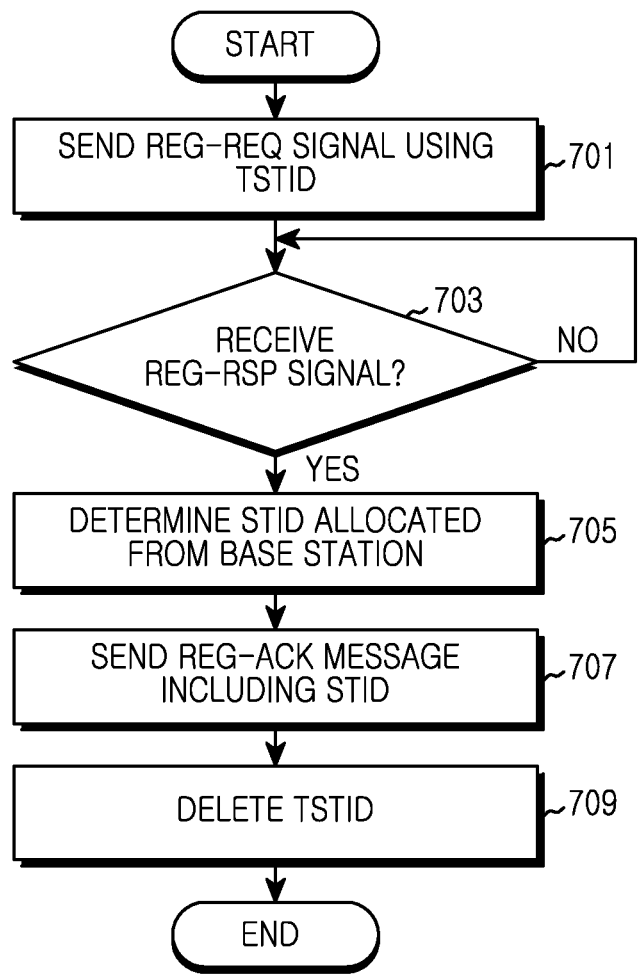
FIG. 7 illustrates a method of a mobile station for sending a response REG-ACK message according to an exemplary embodiment of the present invention.

When the REG-ACK message is used as the response signal for the REG-RSP message, the mobile station 110 operates as shown in FIG. 7.

FIG. 7 illustrates a method of a mobile station for sending a REG-ACK message according to an exemplary embodiment of the present invention.

Referring to FIG. 7, the mobile station performs an initial network entry procedure with a base station. For example, for the initial network entry with the base station, the mobile station carries out the RNG procedure, the SBC procedure, and the PKM procedure. The mobile station is allocated the TSTID from the base station through the RNG-RSP signal.

Thereafter, the mobile station sends the REG-REQ message to the base station in step 701. The REG-REQ message includes the TSTID.

In step 703, the mobile station determines whether the REG-RSP message is received from the base station.

Although it may not be depicted in FIG. 7, if it is determined that no REG-RSP message is received within the reference time, the mobile station recognizes that the transmission of the REG-REQ message fails. Thus, the mobile station retransmits the REG-REQ message to the base station.

If it is determined in step 703 that the REG-RSP message is received, the mobile station determines the STID allocated by the base station, in the REG-RSP message in step 705.

In step 707, the mobile station sends the REG-ACK message including the STID to the base station in reply to the REG-RSP message. For example, the REG-ACK message is defined as shown in Table 1.

TABLE 1

| M/O | Attributes/Array of attributes | Size (bits) | Value/Notes | Conditions |
|---|---|---|---|---|
| M | Message type | 8 | Acknowledge to REG-RSP | N/A |

The REG-ACK message includes only the message type as shown in Table 1.

In step 709, the mobile station deletes the TSTID. When the STID is allocated from the base station, the mobile station communicates with the base station using the STID instead of the TSTID. Accordingly, the mobile station deletes the unnecessary TSTID.

Thereafter, the mobile station completes this process.

Figure 8:
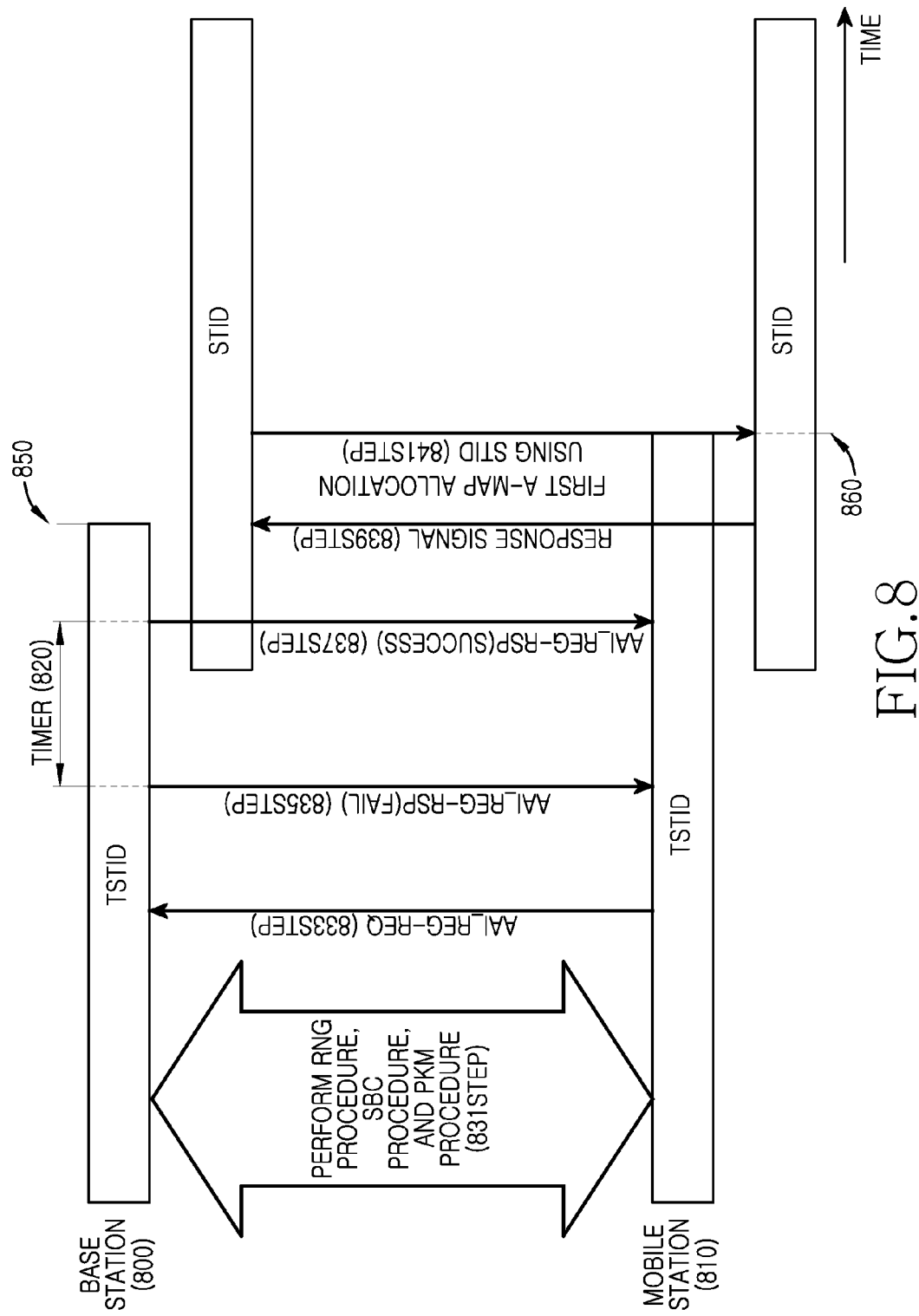
FIG. 8 illustrates a method for sending a response signal for a REG-RSP message in a wireless communication system according to an exemplary embodiment of the present invention.

FIG. 8 illustrates a method for sending a response signal for a REG-RSP message in a wireless communication system according to an exemplary embodiment of the present invention.

Referring to FIG. 8, when a mobile station 810 performs an initial network entry to a base station 800, the base station 800 and the mobile station 810 conduct the RNG procedure, the SBC procedure, and the PKM procedure for the initial network entry in step 831. In so doing, the base station 800 allocates the TSTID to the mobile station 810 using the RNG-RSP signal which is sent in reply to the RNG-REQ of the mobile station 810. Hence, the base station 800 and the mobile station 810 carry out the SBC procedure and the PKM procedure using the TSTID.

After the PKM procedure with the base station 800, the mobile station 810 sends the REG-REQ message to the base station 800 in step 833. The mobile station 810 sends the REG-REQ message using the TSTID.

In reply to the REG-REQ message, the base station 800 sends to the mobile station 810, the REG-RSP message including the STID allocated to the mobile station 810 in step 835. In so doing, the base station 800 does not delete the TSTID of the mobile station 810. That is, the base station 800 maintains the TSTID together with the STID.

Upon sending the REG-RSP message, the base station 800 drives a timer 820 to determine the retransmission point of the REG-RSP message.

When receiving no response signal for the REG-RSP message until the driving time of the timer 820 expires, the base station 800 recognizes that the transmission of the REG-RSP message fails. Thus, the base station 800 retransmits the REG-RSP message to the mobile station 810 in step 837. The base station 800 re-drives the timer 820.

Upon receiving the REG-RSP message, the mobile station 810 determines the STID in the REG-RSP message.

In step 839, the mobile station 810 sends to the base station 800 a response signal for the REG-RSP message. The mobile station 810 sends the response signal using the STID or the TSTID.

When receiving the response signal for the REG-RSP message from the mobile station 810 before the driving time of the timer 820 expires, the base station 800 recognizes that the mobile station 810 switches its identification information from the TSTID to the STID. Upon determining the switching of the identification information of the mobile station 810, the base station 800 communicates with the mobile station 810 using the STID. Hence, the base station 800 deletes the unnecessary TSTID of the mobile station 810 in step 850.

In step 841, the base station 800 sends to the mobile station 810, MAP including the STID of the mobile station 810.

Upon receiving the MAP including the STID, the mobile station 810 recognizes that the base station 800 changes the identification information of the mobile station 810 to the STID. Accordingly, the mobile station 810 deletes the TSTID in step 860.

As explained above, the base station 800 receives from the mobile station 810 the response signal for the REG-RSP message and maintains both of the TSTID and the STID of the mobile station 810 before the switching of the identification information of the mobile station 810 is determined. Upon receiving the response signal, the mobile station 810 can use any one of the MSG ACK message, the bandwidth request header, and the response message.

In this exemplary embodiment of the present invention, upon receiving the response signal from the mobile station, the base station deletes the TSTID of the mobile station.

In contrast, if it is determined that the bandwidth request header is received from the mobile station, the base station may delete the TSTID of the mobile station. More particularly, to allocate the resources for sending the response signal, the mobile station can send the bandwidth request header including the STID to the base station. Based on the bandwidth request header, the base station may recognize that the identification information of the mobile station is switched to the STID. Hence, upon receiving the bandwidth request header from the mobile station, the base station can delete the TSTID of the mobile station.

When the mobile station 810 uses the MSG ACK message as the response signal for the REG-RSP message, the base station 800 operates as shown in FIG. 2. The mobile station 810 operates as shown in FIG. 9.

Figure 9:
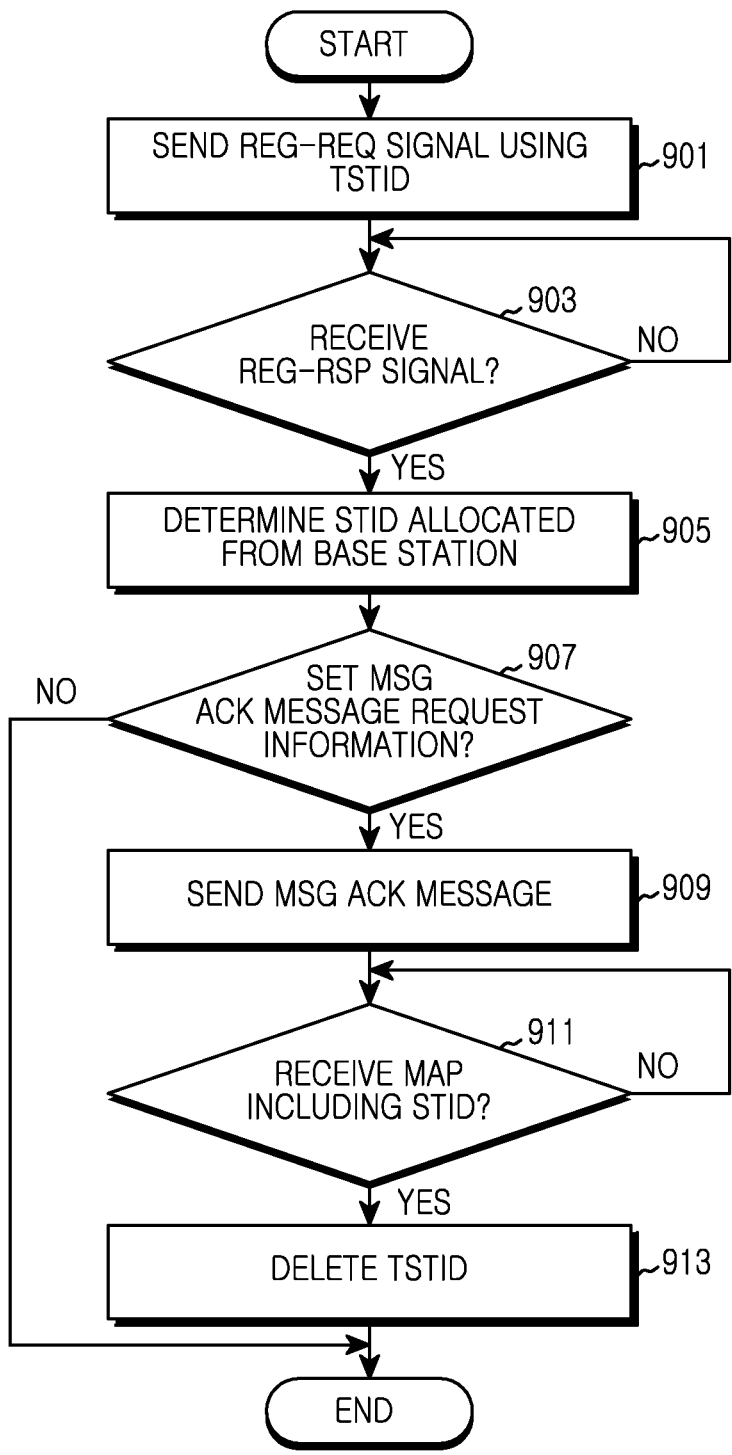
FIG. 9 illustrates a method of a mobile station for sending a MSG-ACK message according to an exemplary embodiment of the present invention.

FIG. 9 illustrates a method of a mobile station for sending mobile station a MSG ACK message according to an exemplary embodiment of the present invention.

Referring to FIG. 9, the mobile station performs an initial network entry procedure with a base station. For example, for the initial network entry with the base station, the mobile station carries out the RNG procedure, the SBC procedure, and the PKM procedure. The mobile station is allocated the TSTID from the base station using the RNG-RSP signal.

Thereafter, the mobile station sends the REG-REQ message to the base station in step 901. The REG-REQ message includes the TSTID.

In step 903, the mobile station determines whether the REG-RSP message is received from the base station.

Although it may not be depicted in FIG. 9, when receiving no REG-RSP message within the reference time, the mobile station recognizes that the transmission of the REG-REQ message fails. Thus, the mobile station retransmits the REG-REQ message to the base station.

If it is determined in step 903 that the REG-RSP message is received, the mobile station determines the STID allocated by the base station, in the REG-RSP message in step 905.

In addition, the mobile station receiving the REG-RSP message determines whether the REG-RSP message includes the MSG ACK request information in step 907. For example, the mobile station determines whether the polling bit of the MCEH of the MPDU carrying the REG-RSP message is set to 1.

If it is determined in step 907 that the REG-RSP message does not include the MSG ACK message request information, the mobile station completes this process.

In contrast, if it is determined in step 907 that the REG-RSP message includes the MSG ACK message request information, the mobile station sends the MSG ACK message to the base station in step 909. At this time, the mobile station sends the MSG ACK message including the TSTID or the STID.

In step 911, the mobile station determines whether the MAP including the STID is received from the base station.

If it is determined in step 911 that the MAP including the STID is received, the mobile station deletes the TSTID in step 913. Upon receiving the MAP including the STID, the mobile station recognizes that the base station changes the identification information of the mobile station to the STID. At this time, the mobile station communicates with the base station using the STID instead of the TSTID. Accordingly, the mobile station deletes the unnecessary TSTID.

Thereafter, the mobile station completes this process.

In this exemplary embodiment of the present invention, when the REG-RSP message does not include the MSG ACK message request information, the mobile station completes this process.

In contrast, when the REG-RSP message includes the MSG ACK message request information, the mobile station may delete the TSTID in step 913.

Figure 10:
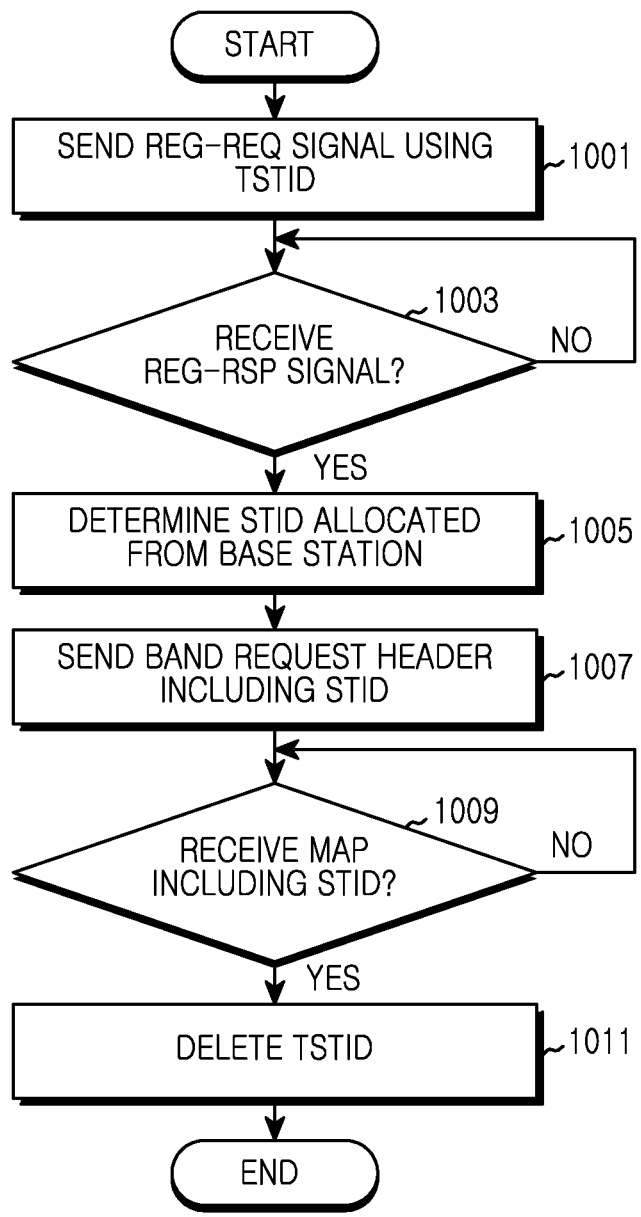
FIG. 10 illustrates a method of a mobile station for sending an bandwidth request header according to an exemplary embodiment of the present invention.

When the mobile station 810 uses the bandwidth request header as the response signal for the REG-RSP message, the base station 800 operates as shown in FIG. 4 and the mobile station 810 operates as shown in FIG. 10.

FIG. 10 illustrates a method of a mobile station for sending a bandwidth request header according to an exemplary embodiment of the present invention.

Referring to FIG. 10, the mobile station performs an initial network entry procedure with a base station. For example, for the initial network entry with the base station, the mobile station carries out the RNG procedure, the SBC procedure, and the PKM procedure. The mobile station is allocated the TSTID from the base station through the RNG-RSP signal.

Thereafter, the mobile station sends the REG-REQ message to the base station in step 1001. The REG-REQ message includes the TSTID.

In step 1003, the mobile station determines whether the REG-RSP message is received from the base station.

Although it may not be depicted in FIG. 10, when receiving no REG-RSP message within the reference time, the mobile station recognizes that the transmission of the REG-REQ message fails. Thus, the mobile station retransmits the REG-REQ message to the base station.

If it is determined in step 1003 that the REG-RSP message is received, the mobile station determines the STID allocated by the base station, in the REG-RSP message in step 1005.

Thereafter, the mobile station sends the bandwidth request header including the STID to the base station in step 1007. For instance, when the mobile station has data to transmit, it sends the bandwidth request header to the base station so as to allocate the necessary resources. When the mobile station has no data to transmit, it sends to the base station the bandwidth request header including the requested bandwidth set to zero.

In step 1009, the mobile station determines whether the MAP including the STID is received from the base station.

If it is determined in step 1009 that the MAP including the STID is received, the mobile station deletes the TSTID in step 1011. More specifically, upon receiving the MAP including the STID, the mobile station recognizes that the base station switches the identification information of the mobile station to the STID. In this case, the mobile station communicates with the base station using the STID instead of the TSTID. Accordingly, the mobile station deletes the unnecessary TSTID.

Thereafter, the mobile station completes this process.

In this exemplary embodiment of the present invention, when there is no data to transmit, the mobile station sets the requested bandwidth of the bandwidth request header to zero.

In contrast, when there is data to transmit, the mobile station can set the requested bandwidth of the bandwidth request header to a certain small value (e.g., 1 byte). In this case, the mobile station is allocated the requested resource from the base station and deletes the TSTID.

Figure 11:
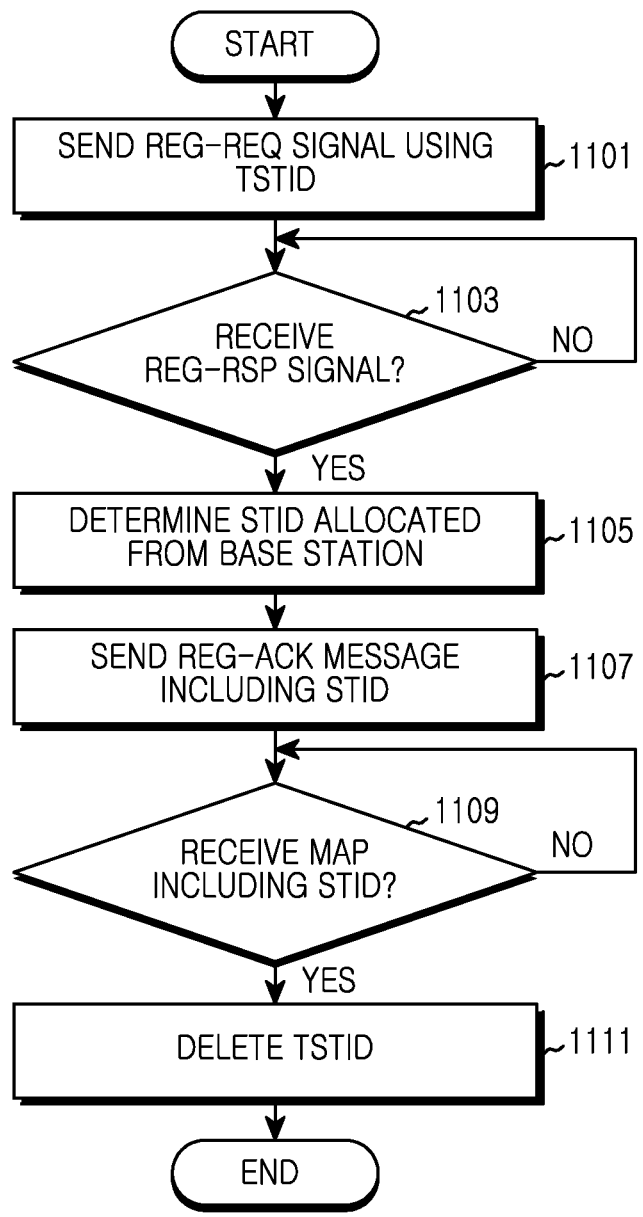
FIG. 11 illustrates a method of a mobile station for sending a response REG-ACK message according to an exemplary embodiment of the present invention.

When the mobile station 810 uses the response message as the response signal for the REG-RSP message, the base station 800 operates as shown in FIG. 6 and the mobile station 810 operates as shown in FIG. 11.

FIG. 11 illustrates a method of a mobile station for sending a REG-ACK message signal according to an exemplary embodiment of the present invention.

Referring to FIG. 11, the mobile station performs an initial network entry procedure with a base station. For example, for the initial network entry with the base station, the mobile station carries out the RNG procedure, the SBC procedure, and the PKM procedure. The mobile station is allocated the TSTID from the base station through the RNG-RSP signal.

Thereafter, the mobile station sends the REG-REQ message to the base station in step 1101. The REG-REQ message includes the TSTID.

In step 1103, the mobile station determines whether the REG-RSP message is received from the base station.

Although it may not be depicted in FIG. 11, when no REG-RSP message is received within the reference time, the mobile station recognizes that the transmission of the REG-REQ message fails. Thus, the mobile station retransmits the REG-REQ message to the base station.

If it is determined in step 1103 that the REG-RSP message is received, the mobile station determines the STID allocated by the base station, in the REG-RSP message in step 1105.

In step 1107, the mobile station sends the REG-ACK message to the base station using the STID in reply to the REG-RSP message. For example, the REG-ACK message includes only the message type as shown in Table 1.

In step 1109, the mobile station determines whether the MAP including the STID is received from the base station.

If it is determined in step 1109 that the MAP including the STID is received, the mobile station deletes the TSTID in step 1111. More specifically, when receiving the MAP including the STID, the mobile station recognizes that the base station switches the identification information of the mobile station to the STID. In this case, the mobile station communicates with the base station using the STID instead of the TSTID. Accordingly, the mobile station deletes the unnecessary TSTID.

Thereafter, the mobile station completes this process.

In FIGS. 8 through 11, when receiving the MAP including the STID allocated by the base station, the mobile station deletes the TSTID.

Alternatively, the mobile station can send the response signal to the base station in reply to the REG-RSP message and drive the timer. When the REG-RSP message including the TSTID is not received until the driving time of the timer expires, the mobile station may delete the TSTID.

In those exemplary embodiments of the present invention, when the REG-RSP message includes response signal request information, the mobile station sends the response signal for the REG-RSP message to the base station.

Alternatively, upon receiving the REG-RSP message, the mobile station may send the response signal for the REG-RSP message to the base station regardless of the setting information.

Now, an exemplary method for allocating the STID using Hybrid Automatic Repeat reQuest (HARQ) is described.

Figure 12:
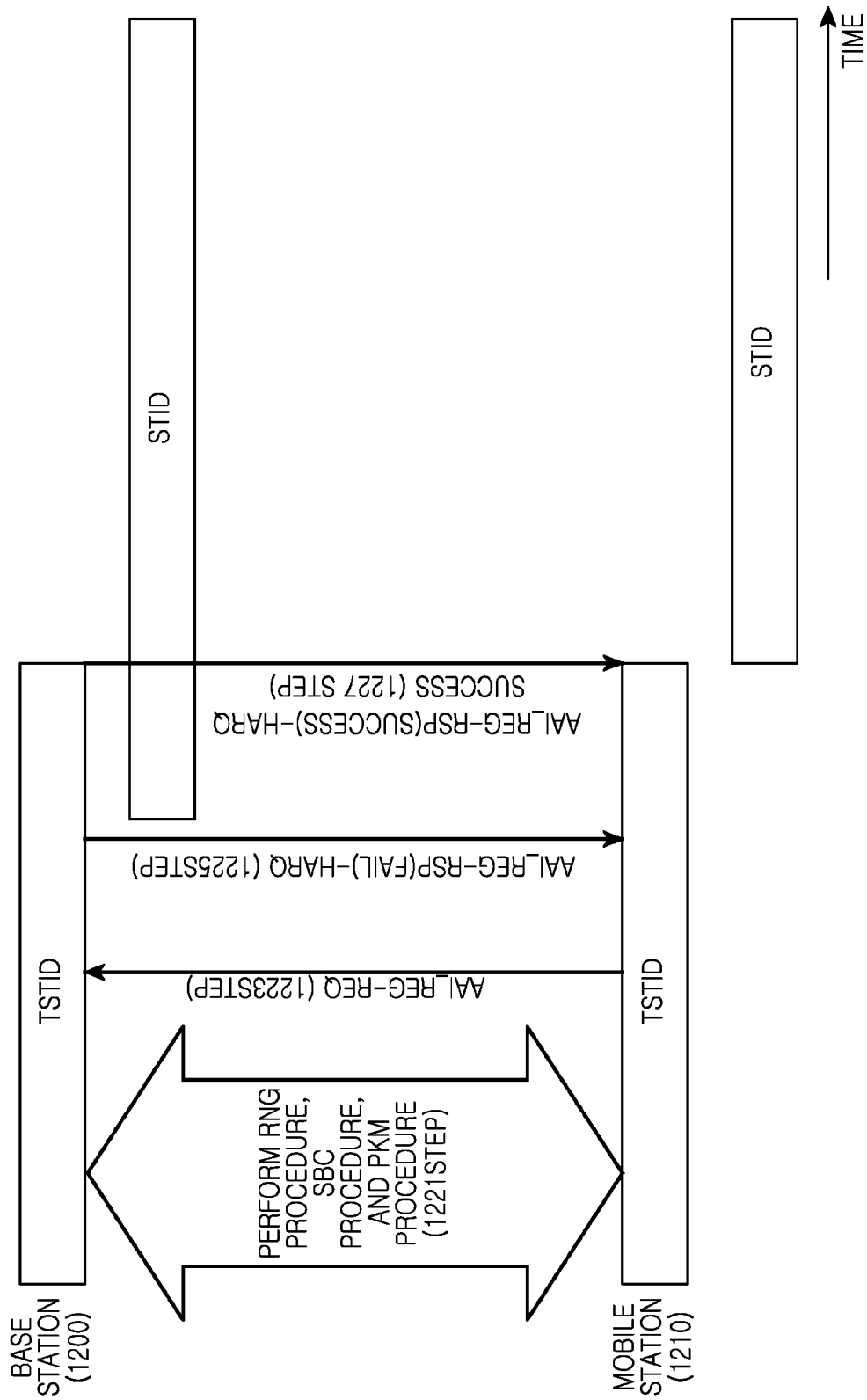
FIG. 12 illustrates a method for performing a Hybrid Automatic Repeat reQuest (HARQ) for a REG-RSP message in a wireless communication system according to an exemplary embodiment of the present invention.

FIG. 12 illustrates a method for performing a HARQ for a REG-RSP message in a wireless communication system according to an exemplary embodiment of the present invention.

Referring to FIG. 12, when a mobile station 1210 performs an initial network entry to a base station 1200, the base station 1200 and the mobile station 1210 conduct the RNG procedure, the SBC procedure, and the PKM procedure for the initial network entry in step 1221. In so doing, the base station 1200 allocates the TSTID to the mobile station 1210 using the RNG-RSP signal which is sent in reply to the RNG-REQ of the mobile station 1210. Hence, the base station 1200 and the mobile station 1210 carry out the SBC procedure and the PKM procedure using the TSTID.

After the PKM procedure with the base station 1200, the mobile station 1210 sends the REG-REQ message to the base station 1200 in step 1223. The mobile station 1210 sends the REG-REQ message using the TSTID.

In reply to the REG-REQ message, the base station 1200 sends to the mobile station 1210, the REG-RSP message including the STID allocated to the mobile station 1200 in step 1225. In so doing, the base station 1200 sends the REG-RSP message to the mobile station 1210 using a HARQ packet in step 1227. The base station 1200 does not delete the TSTID of the mobile station 1210 and maintains the TSTID together with the STID.

When error occurs in the HARQ packet received from the base station 1200, the mobile station 1210 sends a Non Acknowledgement (NACK) signal for the HARQ packet to the base station 1200.

Upon receiving the NACK signal from the mobile station 1210, the base station 1200 retransmits the HARQ packet including the REG-RSP message to the mobile station 1210.

When the HARQ packet is received successfully, the mobile station 1210 sends an ACK signal for the HARQ packet to the base station 1200. The mobile station 1210 deletes the TSTID.

Upon receiving the ACK signal from the mobile station 1210, the base station 1200 recognizes that the REG-RSP message for the ACK signal is transmitted successfully. The base station 1200 recognizes that the mobile station 1210 switches its identification information from the TSTID to the STID. Upon determining the switching of the identification information of the mobile station 1210, the base station 1200 communicates with the mobile station 1210 using the STID. Naturally, the base station 1200 deletes the unnecessary TSTID of the mobile station 1210.

Figure 13:
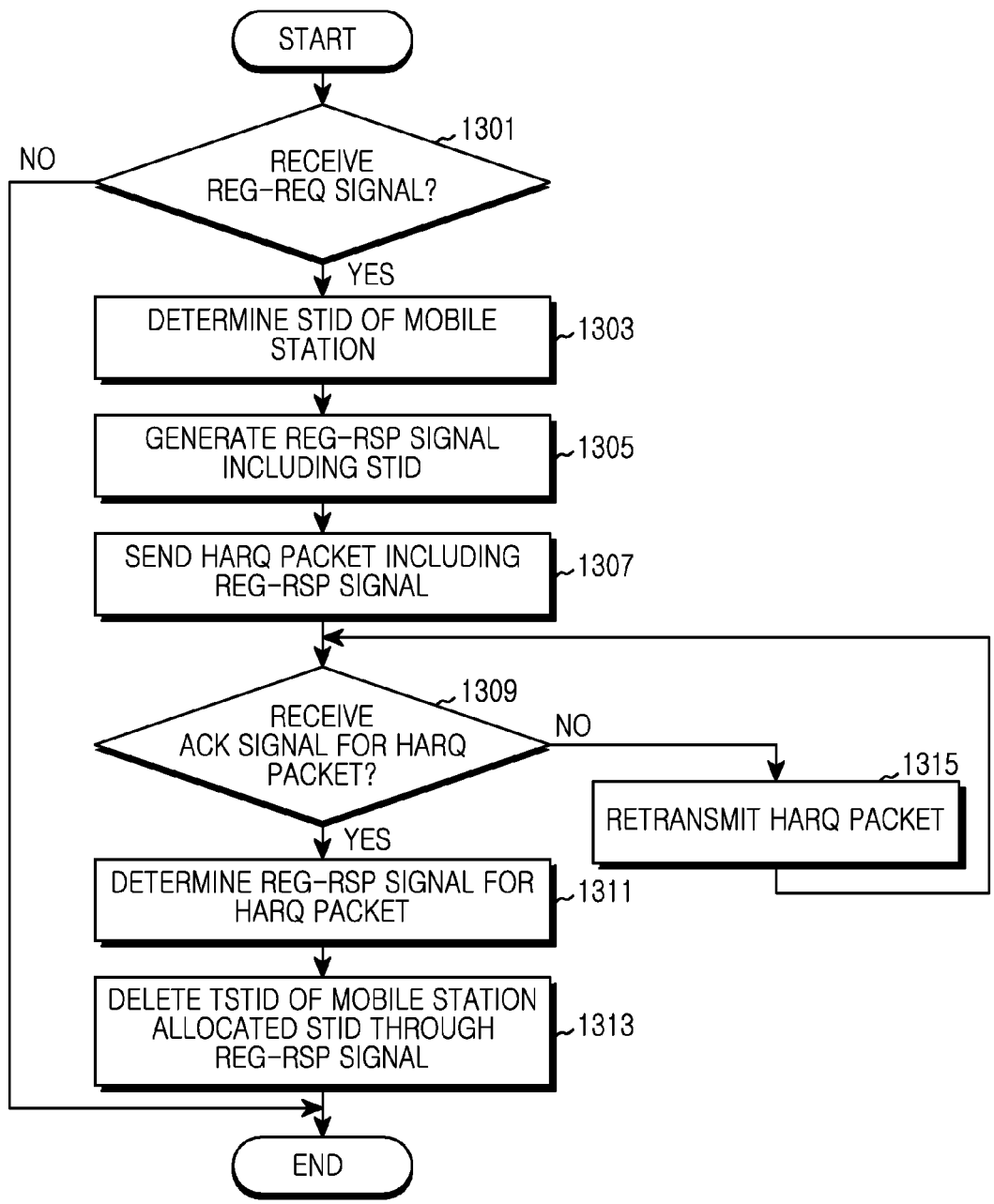
FIG. 13 illustrates a method of a base station for performing a HARQ for a REG-RSP message according to an exemplary embodiment of the present invention.

Upon sending the REG-RSP message using the HARQ, the base station 1200 operates as shown in FIG. 13.

FIG. 13 illustrates a method of a base station for performing a HARQ for a REG-RSP message according to an exemplary embodiment of the present invention.

Referring to FIG. 13, the base station performs an initial network entry procedure with a mobile station. For example, the base station carries out the RNG procedure, the SBC procedure, and the PKM procedure for the initial network entry with the mobile station. In so doing, the base station allocates the TSTID to the mobile station using the RNG-RSP signal.

In step 1301, the base station determines whether the REG-REQ message is received from the mobile station. The REG-REQ message includes the TSTID allocated to the mobile station.

If it is determined in step 1301 that the REG-REQ message is received, the base station determines the STID to be allocated to the mobile station in step 1303.

In step 1305, the base station generates the REG-RSP message including the STID.

In step 1307, the base station generates and transmits the HARQ packet including the REG-RSP message to the mobile station. The base station separately manages the mapping relation of the HARQ packet and the REG-RSP message.

In step 1309, the base station determines whether the ACK signal is received for the HARQ packet.

If it is determined in step 1309 that the ACK signal is not received for the HARQ packet (i.e., that the NACK signal is received), the base station retransmits the HARQ packet including the REG-RSP message in step 1315.

Thereafter, the base station determines whether the ACK signal is received for the HARQ packet in step 1309.

In contrast, if it is determined in step 1309 that the ACK signal is received for the HARQ packet, the base station determines the REG-RSP message corresponding to the ACK signal in step 1311.

Upon determining the REG-RSP message corresponding to the ACK signal, the base station recognizes that the mobile station switches its identification information from the TSTID to the STID contained in the REG-RSP message. When determining the switching of the identification information of the mobile station, the base station communicates with the mobile station using the STID. In step 1313, the base station deletes the TSTID of the mobile station.

Thereafter, the base station completes this process.

Figure 14:
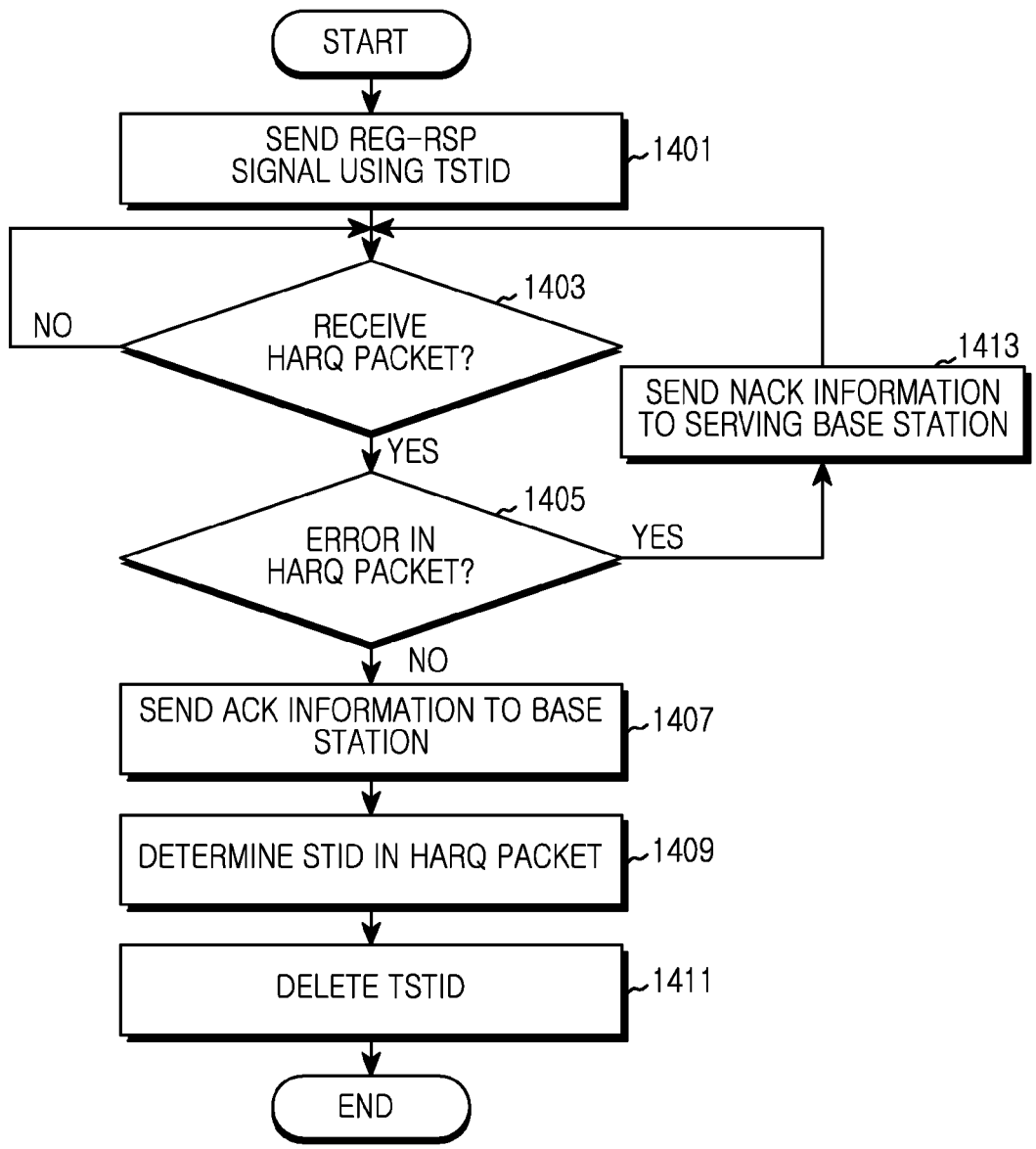
FIG. 14 illustrates a method of a mobile station for performing a HARQ for a REG-RSP message according to an exemplary embodiment of the present invention.

When the base station 1200 sends the REG-RSP message using the HARQ, the mobile station 1210 operates as shown in FIG. 14.

FIG. 14 illustrates a method of a mobile station for performing a HARQ for a REG-RSP message according to an exemplary embodiment of the present invention.

Referring to FIG. 14, the mobile station performs an initial network entry procedure with a base station. For example, for the initial network entry with the base station, the mobile station carries out the RNG procedure, the SBC procedure, and the PKM procedure. The mobile station is allocated the TSTID from the base station using the RNG-RSP signal.

Thereafter, the mobile station sends the REG-REQ message to the base station in step 1401. The REG-REQ message includes the TSTID.

In step 1403, the mobile station determines whether the HARQ packet is received from the base station.

If it is determined in step 1403 that the HARQ packet is received from the base station, the mobile station determines whether error occurs in the HARQ packet in step 1405.

If it is determined in step 1405 that the HARQ packet has an error, the mobile station sends the NACK signal for the HARQ packet to the base station in step 1413.

In contrast, if it is determined in step 1405 that the HARQ packet has no error, the mobile station sends the ACK signal for the HARQ packet to the base station in step 1407.

In step 1409, the mobile station determines the STID allocated by the base station in the REG-RSP message of the HARQ packet.

In step 1411, the mobile station deletes the TSTID. That is, when the STID is allocated from the base station, the mobile station communicates with the base station using the STID instead of the TSTID. Hence, the mobile station deletes the unnecessary TSTID.

Thereafter, the mobile station completes this process.

In the following, a structure of the base station for allocating the TSTID and the STID is described.

Figure 15:
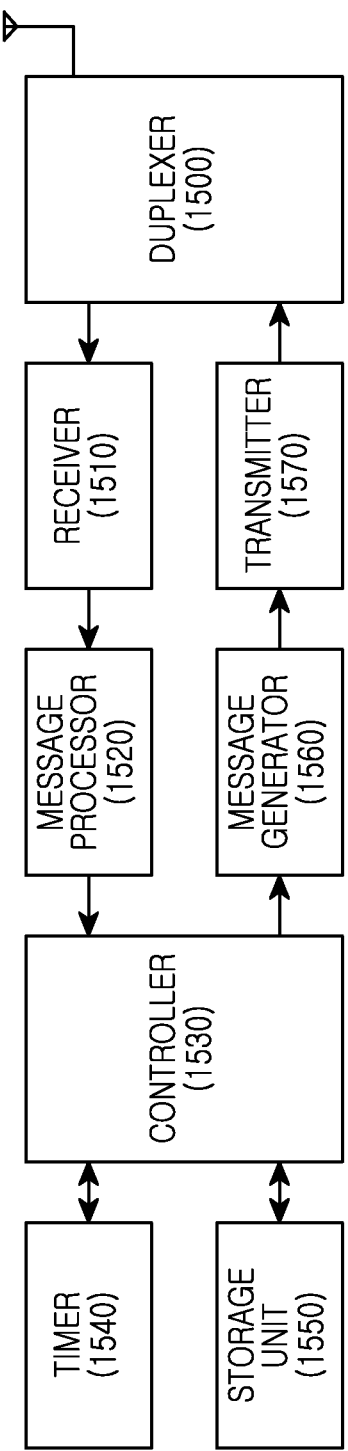
FIG. 15 is a block diagram of a base station according to an exemplary embodiment of the present invention.

FIG. 15 is a block diagram of a base station according to an exemplary embodiment of the present invention.

Referring to FIG. 15, the base station includes a duplexer 1500, a receiver 1510, a message processor 1520, a controller 1530, a timer 1540, a storage unit 1550, a message generator 1560, and a transmitter 1570.

The duplexer 1500 sends a transmit signal output from the transmitter 1570 over an antenna, and provides a receive signal from the antenna to the receiver 1510 according to the duplexing scheme.

The receiver 1510 converts and demodulates a Radio Frequency (RF) signal fed from the duplexer 1500 to a baseband signal. The receiver 1510 may include an RF processing block, a demodulating block, a channel decoding block, and the like. For example, the RF processing block converts the RF signal output from the duplexer 1500 to the baseband signal. The demodulating block may include a Fast Fourier Transform (FFT) operator for extracting data from subcarriers of the signal output from the RF processing block. The channel decoding block may include a demodulator, a deinterleaver, a channel decoder, and the like.

The message processor 1520 extracts control information from the signal output from the receiver 1510 and provides the extracted control information to the controller 1530. For example, the message processor 1520 extracts the RNG-REQ signal, the signal for the SBC, the signal for the PKM, and the REG-REQ message from the signal output from the receiver 1510, and provides the extracted signals to the controller 1530.

The controller 1530 controls the operations of the base station and the initial access procedure with the mobile station. For instance, when the RNG-REQ signal of the mobile station is fed from the message processor 1520, the controller 1530 allocates the TSTID to the mobile station using the RNG-RSP signal. The controller 1530 controls the performance of the SBC procedure and the PKM procedure with the mobile station using the TSTID. Thereafter, when the REG-REQ message of the mobile station is fed from the message processor 1520, the controller 1530 allocates the STID to the mobile station using the REG-RSP message.

The controller 1530 maintains both of the TSTID and the STID of the mobile station until it determines the switching of the identification information from the TSTID to the STID. When determining the switching of the identification information of the mobile station, the controller 1530 deletes the TSTID of the mobile station. For example, the controller 1530 determines the switching of the identification information of the mobile station based on any one of the MSG ACK message, the bandwidth request header, and the response message received from the mobile station as shown in FIGS. 2, 4 and 6. For example, the controller 1530 may determine the switching of the identification information of the mobile station based on the HARQ for the REG-RSP message as shown in FIG. 13.

The timer 1540 is used to determine the retransmission point of the REG-RSP message. To send the REG-RSP message, the timer 1540 is driven under the control of the controller 1530. When the response signal for the REG-RSP message is not received from the mobile station until the driving time of the timer 1540 expires, the controller 1530 retransmits the REG-RSP message to the mobile station.

The storage unit 1550 stores a program for controlling the base station, and data generated in the program execution. For example, the storage unit 1550 stores the TSTID and the STID allocated to the mobile station.

The message generator 1560 generates a control message to send to the mobile station under the control of the controller 1530. For example, under the control of the controller 1530, the message generator 1560 generates the RNG-RSP signal, the signal for the SBC, the signal for the PKM, and the REG-RSP message to send to the mobile station. Herein, the RNG-RSP signal includes the TSTID of the mobile station and the REG-RSP message includes the STID of the mobile station.

The transmitter 1570 encodes and converts the data to send to the mobile station and the control message fed from the message generator 1560, to an RF signal and outputs the RF signal to the duplexer 1500. For example, the transmitter 1570 may include a channel encoding block, a modulating block, an RF processing block, and the like. Herein, the channel encoding block may include a modulator, an interleaver, a channel encoder, and the like. The modulating block may include an Inverse FFT (IFFT) operator for mapping the signal output from the channel encoding block to subcarriers. The RF processing block converts the baseband signal output from the modulating block to an RF signal and outputs the RF signal to the duplexer 1500.

Now, a structure of the mobile station for switching the TSTID to the STID is explained.

Figure 16:
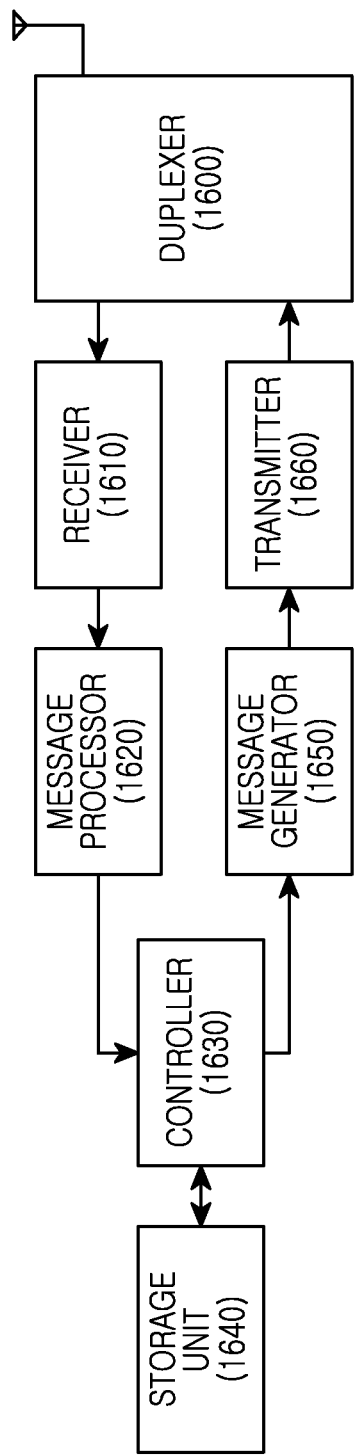
FIG. 16 is a block diagram of a mobile station according to an exemplary embodiment of the present invention.

FIG. 16 is a block diagram of a mobile station according to an exemplary embodiment of the present invention.

Referring to FIG. 16, the mobile station includes a duplexer 1600, a receiver 1610, a message processor 1620, a controller 1630, a storage unit 1640, a message generator 1650, and a transmitter 1660.

The duplexer 1600 sends a transmit signal output from the transmitter 1660 over an antenna, and provides a receive signal from the antenna to the receiver 1610 according to the duplexing scheme.

The receiver 1610 converts and demodulates an RF signal fed from the duplexer 1600 to a baseband signal. The receiver 1610 may include an RF processing block, a demodulating block, a channel decoding block, and the like. For example, the RF processing block converts the RF signal output from the duplexer 1600 to the baseband signal. The demodulating block may include an FFT operator for extracting data from subcarriers of the signal output from the RF processing block. The channel decoding block may include a demodulator, a deinterleaver, a channel decoder, and the like.

The message processor 1620 extracts control information from the signal output from the receiver 1610 and provides the extracted control information to the controller 1630. For example, the message processor 1620 extracts the RNG-RSP signal, the signal for the SBC, the signal for the PKM, and the REG-RSP message from the signal output from the receiver 1610, and provides the extracted signals to the controller 1630.

The controller 1630 controls the operations of the mobile station and the initial access procedure with the base station. For instance, the controller 1630 controls the transmission of the RNG-REQ signal to the base station for the initial access with the base station. Thereafter, when the TSTID is allocated through the RNG-RSP signal, the controller 1630 controls the performance of the SBC procedure and the PKM procedure with the base station using the TSTID.

When the message processor 1620 provides the REG-RSP message, the controller 1630 determines the STID allocated by the base station in the REG-RSP message.

When the STID is allocated from the base station, the controller 1630 switches the TSTID to the STID. The controller 1630 informs the base station of the switching of the identification information using any one of the MSG ACK message, the bandwidth request header, and the response message, as the response signal as shown in FIGS. 3, 5, 7, 9, 10, and 11.

When the switching of the identification information is transmitted to the base station as shown in FIGS. 3, 5 and 7, the controller 1630 sends the response signal for the REG-RSP message to the base station and controls to delete the TSTID. When the switching of the identification information is transmitted to the base station as shown in FIGS. 9, 10 and 11, the controller 1630 may send the response signal for the REG-RSP message and delete the TSTID when the MAP including the STID is received. After the response signal for the REG-RSP message is transmitted, when the REG-RSP message including the TSTID is not received over a certain time, the controller 1630 may delete the TSTID.

The storage unit 1640 stores a program for controlling the mobile station, and data generated in the program execution. For example, the storage unit 1640 stores the TSTID and the STID allocated from the base station.

The message generator 1650 generates a control message to send to the base station under the control of the controller 1630. For example, under the control of the controller 1630, the message generator 1650 generates the RNG-REQ message to send to the base station for the initial network entry. The message generator 1650 generates the signal for the SBC, the signal for the PKM, and the REG-REQ message including the TSTID under the control of the controller 1630. The message generator 1650 generates the response signal for the REG-RSP message under the control of the controller 1630.

The transmitter 1660 encodes and converts the data to send to the base station and the control message output from the message generator 1650, to an RF signal and outputs the RF signal to the duplexer 1600. For example, the transmitter 1660 may include a channel encoding block, a modulating block, an RF processing block, and the like. Herein, the channel encoding block may include a modulator, an interleaver, a channel encoder, and the like. The modulating block may include an IFFT operator for mapping the signal output from the channel encoding block to subcarriers. The RF processing block converts the baseband signal output from the modulating block to an RF signal and outputs the RF signal to the duplexer 1600.

In this exemplary embodiment of the present invention, the controller 1630 of the mobile station informs the base station of the switching of the identification information of the mobile station by sending the response signal for the REG-RSP message.

Alternatively, the controller 1630 may inform the base station of the switching of the identification information of the mobile station by performing the HARQ for the REG-RSP message.

As set forth above, when the mobile station of the wireless communication system switches its identification information to the STID, the mobile station sends the mobile station identification switch information to the base station and the base station maintains the identification information of the mobile station as the TSTID until the switching of the identification information of the mobile station is determined. Therefore, the identification information of the mobile station recognized by the mobile station and the base station can be matched.

Furthermore, the wireless communication system uses the TSTID as the identification information of the mobile station before the registration procedure, and uses the STID as the identification information of the mobile station after the registration procedure. Therefore, the exposure of the identification information of the mobile station can be addressed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating of a mobile station in a wireless communication system, the method comprising:
    sending a RaNGing (RNG)-REQuest (REQ) message to a base station;
    receiving a RNG-ReSPonse (RSP) message including a temporary station identifier from the base station, wherein the temporary station identifier is used until a station identifier is allocated;
    sending a REGistration (REG)-REQ message to the base station;
    receiving a REG-RSP message comprising the station identifier of the mobile station from the base station, the station identifier being assigned to the mobile station by the base station;
    after receiving the REG-RSP message from the base station, sending a response signal to the base station so that the base station deletes the temporary station identifier of the mobile station; and
    communicating with the base station using the station identifier.

2. The method of claim 1, further comprising:
    after receiving the RNG-RSP message, performing a Subscriber station Basic Capability (SBC) procedure and a Privacy and Key Management (PKM) procedure with the base station using the temporary station identifier.

3. The method of claim 1, wherein the REG-RSP message comprises a predefined bit of a Media Access Control (MAC) Control Extended Header (MCEH), and
    wherein the sending of the response signal to the base station comprises:
        when the predefined bit of the MCEH is set, sending the response signal to the base station.

4. The method of claim 1, wherein the sending of the response signal to the base station comprises:
    sending a Message Acknowledgement (MSG-ACK) message containing the station identifier to the base station.

5. The method of claim 1, wherein the sending of the response signal to the base station comprises:
    sending a bandwidth request header containing the station identifier to the base station.

6. The method of claim 1, further comprising:
    after receiving the REG-RSP message from the base station, deleting the temporary station identifier.

7. A method for operating a base station in a wireless communication system, the method comprising:
    receiving a RaNGing (RNG)-REQuest (REQ) message from a mobile station;
    transmitting a RNG-ReSPonse (RSP) message including a temporary station identifier to the mobile station, wherein the temporary station identifier is used until a station identifier is allocated;
    receiving a REGistration (REG)-REQ message from the mobile station;
    transmitting a REG-RSP message comprising the station identifier to the mobile station, wherein the station identifier is assigned to the mobile station by the base station;
    receiving a response signal from the mobile station;
    after receiving the response signal from the mobile station, deleting the temporary station identifier of the mobile station; and
    communicating with the mobile station using the station identifier.

8. The method of claim 7, further comprising:
    after transmitting the RNG-RSP message, performing a Subscriber station Basic Capability (SBC) procedure and a Privacy and Key Management (PKM) procedure with the mobile station using the temporary station identifier.

9. The method of claim 7, wherein the REG-RSP message comprises a predefined bit of a Media Access Control (MAC) Control Extended Header (MCEH).

10. The method of claim 9, wherein, when the predefined bit of the MCEH of the REG-RSP message is set, the response signal is sent to the base station by the mobile station.

11. The method of claim 7, wherein the response signal comprises a Message Acknowledgement (MSG-ACK) message containing the station identifier.

12. The method of claim 7, wherein the response signal comprises a bandwidth request header containing the station identifier to the base station.

13. An apparatus of a mobile station in a wireless communication system, the apparatus comprising:
    a transmitter;
    a receiver; and
    a controller,
    wherein the transmitter is configured to send a RaNGing (RNG)-REQuest (REQ) message to a base station;
    the receiver is configured to receive a RNG-ReSPonse (RSP) message including a temporary station identifier from the base station, wherein the temporary station identifier is used until a station identifier is allocated;
    the transmitter is configured to send a REGistration (REG)-REQ message to the base station;
    the receiver is configured to receive a REG-RSP message comprising the station identifier of the mobile station from the base station, the station identifier being assigned to the mobile station by the base station;

the transmitter is configured to, after receiving the REG-RSP message from the base station, send a response signal to the base station so that the base station deletes the temporary station identifier of the mobile station; and the controller is configured to control the transmitter and the receiver to communicate with the base station using the station identifier.

14. The apparatus of claim 13, wherein the controller is further configured to, after receiving the RNG-RSP message, perform a Subscriber station Basic Capability (SBC) procedure and a Privacy and Key Management (PKM) procedure with the base station using the temporary station identifier.

15. The apparatus of claim 13, wherein the REG-RSP message comprises a predefined bit of a Media Access Control (MAC) Control Extended Header (MCEH), and
wherein the transmitter is configured to send the response signal to the base station, when the predefined bit of the MCEH of the REG-RSP message is set.

16. The apparatus of claim 13, wherein the response signal comprises a Message Acknowledgement (MSG-ACK) message containing the station identifier.

17. The apparatus of claim 13, wherein the response signal comprises a bandwidth request header containing the station identifier.

18. The apparatus of claim 13, wherein the controller is further configured to, after receiving the REG-RSP message from the base station, delete the temporary station identifier.

19. An apparatus of a base station in a wireless communication system, the apparatus comprising:
a transmitter;
a receiver; and
a controller,
wherein the receiver is configured to receive a RaNGing (RNG)-REQuest (REQ) message from a mobile station;
the transmitter is configured to transmit a RNG-ReSPonse (RSP) message including a temporary station identifier to the mobile station, wherein the temporary station identifier is used until a station identifier is allocated;
the receiver is configured to receive a REGistration (REG)-REQ message from the mobile station;
the transmitter is configured to transfer a REG-RSP message comprising the station identifier to the mobile station, wherein the station identifier is assigned to the mobile station by the base station;
the receiver is configured to receive a response signal from the mobile station;
the controller is configured to, after receiving the response signal from the mobile station, delete the temporary station identifier of the mobile station; and
the controller is configured to control the transmitter and the receiver to communicate with the mobile station using the station identifier.

20. The apparatus of claim 19, wherein the controller is further configured to, after transmitting the RNG-RSP message, perform a Subscriber station Basic Capability (SBC) procedure and a Privacy and Key Management (PKM) procedure with the mobile station using the temporary station identifier.

21. The apparatus of claim 19, wherein the REG-RSP message comprises a predefined bit of a Media Access Control (MAC) Control Extended Header (MCEH).

22. The apparatus of claim 21, wherein, when the predefined bit of the MCEH of the REG-RSP message is set, the mobile station is configured to send the response signal to the base station.

23. The apparatus of claim 19, wherein the response signal comprises a Message Acknowledgement (MSG-ACK) message containing the station identifier.

24. The apparatus of claim 19, wherein the response signal comprises a bandwidth request header containing the station identifier to the base station.

* * * * *